US012570448B2

(12) United States Patent　　(10) Patent No.: US 12,570,448 B2
Naumann et al.　　(45) Date of Patent: Mar. 10, 2026

(54) CLOSURE DEVICE FOR CONTAINER

(71) Applicant: Husky Injection Molding Systems Ltd., Bolton (CA)

(72) Inventors: Tobias Naumann, Merzig (DE);
Stephan Scherer, Trierweiler (DE);
Cedric Boulay, Bulgneville (FR)

(73) Assignee: Husky Injection Molding Systems Ltd., Bolton (CA)

( * ) Notice: Subject to any disclaimer, the term of this patent is extended or adjusted under 35 U.S.C. 154(b) by 98 days.

(21) Appl. No.: 17/767,305

(22) PCT Filed: Oct. 2, 2020

(86) PCT No.: PCT/CA2020/051321
§ 371 (c)(1),
(2) Date: Apr. 7, 2022

(87) PCT Pub. No.: WO2021/068058
PCT Pub. Date: Apr. 15, 2021

(65) Prior Publication Data
US 2022/0371795 A1　　Nov. 24, 2022

Related U.S. Application Data

(60) Provisional application No. 62/913,926, filed on Oct. 11, 2019.

(51) Int. Cl.
B65D 55/16 (2006.01)
B29C 45/26 (2006.01)
(Continued)

(52) U.S. Cl.
CPC .............. B65D 55/16 (2013.01); B29C 45/26 (2013.01); B65D 41/3428 (2013.01); B29L 2031/565 (2013.01)

(58) Field of Classification Search
CPC ................ B65D 55/16; B65D 41/3428; B65D 2251/1008; B65D 2401/30; B65D 41/325;
(Continued)

(56) References Cited

U.S. PATENT DOCUMENTS 1,806,479 A　5/1931　Lory
2,852,054 A　9/1958　Motley
(Continued)

FOREIGN PATENT DOCUMENTS

CA　　2676854 A1　2/2011
CA　　3082235 A1　6/2019
(Continued)

OTHER PUBLICATIONS

English translation of JP 2010018290 (Year: 2010).*
(Continued)

*Primary Examiner* — Don M Anderson
*Assistant Examiner* — Eric C Baldrighi
(74) *Attorney, Agent, or Firm* — Wolf, Greenfield & Sacks, P.C.

(57)　　ABSTRACT

A closure device for a container that defines a neck and an annular flange. The closure device comprises a cap body, a tamper evidence (TE) band positioned below the annular flange, a tongue that extends from the cap body towards the tamper evidence band and first and second leashes positioned on either side of the tongue. The first and second leashes connect the cap body to the tamper evidence (TE) band, and allow the cap body to be removed from the neck of the container while remaining attached to the tamper evidence (TE) band. When the cap body is actuated to a fully open position the first and second leashes act as a torsion spring for causing the tongue to exert a force against the neck of the container for retaining the cap body in the fully open position.

27 Claims, 7 Drawing Sheets

(51) Int. Cl.
  B29L 31/56 (2006.01)
  B65D 41/34 (2006.01)
(58) Field of Classification Search
  CPC .... B65D 41/34; B65D 41/3423; B29C 45/26;
    B29C 2045/4078; B29L 2031/565; B29L
    2031/56
  USPC ........................................................ 215/243
  See application file for complete search history.

(56) References Cited

U.S. PATENT DOCUMENTS

| | | | |
|---|---|---|---|
| 2,864,521 | A | 12/1958 | Kundert |
| 3,016,168 | A | 1/1962 | Larson |
| 3,904,062 | A | 9/1975 | Grussen |
| 3,986,627 | A | 10/1976 | Zapp |
| 4,394,918 | A | 7/1983 | Grussen |
| 4,505,401 | A | 3/1985 | Berglund |
| 4,513,870 | A | 4/1985 | Zaltsman |
| 4,557,393 | A | 12/1985 | Boik |
| 4,564,114 | A | 1/1986 | Cole |
| 4,565,293 | A | 1/1986 | Jonas |
| 4,805,792 | A | 2/1989 | Lecinski, Jr. |
| 4,892,208 | A | 1/1990 | Sledge |
| 5,078,296 | A | 1/1992 | Amidzich |
| 5,215,204 | A | 6/1993 | Beck et al. |
| 5,246,125 | A | 9/1993 | Julian |
| 5,307,948 | A | 5/1994 | Blackburn et al. |
| D350,482 | S | 9/1994 | Hu et al. |
| 5,360,126 | A | 11/1994 | Snyder et al. |
| D353,328 | S | 12/1994 | Nuffer |
| 5,395,006 | A | 3/1995 | Verma |
| 5,653,353 | A | 8/1997 | Otto |
| 5,725,115 | A | 3/1998 | Bösl et al. |
| 5,765,705 | A | 6/1998 | Deubel |
| D402,202 | S | 12/1998 | Sherman et al. |
| 6,264,051 | B1 | 7/2001 | Reidenbach |
| 6,474,491 | B1 | 11/2002 | Benoit-Gonin et al. |
| D475,923 | S | 6/2003 | Renz |
| 6,648,158 | B1 | 11/2003 | Lawrence |
| 6,745,900 | B2 | 6/2004 | Lambert |
| 6,931,821 | B2 | 8/2005 | Wong |
| 7,051,888 | B2 | 5/2006 | Antier et al. |
| 7,073,679 | B1 | 7/2006 | Lagler et al. |
| D540,670 | S | 4/2007 | Moribata et al. |
| D585,277 | S | 1/2009 | Beauplan |
| D593,856 | S | 6/2009 | Kubler |
| D606,399 | S | 12/2009 | Scuturio |
| D613,599 | S | 4/2010 | Khubani |
| D621,260 | S | 8/2010 | Brannon et al. |
| 7,823,736 | B1 | 11/2010 | Pugne et al. |
| 7,857,155 | B2 | 12/2010 | Roberts et al. |
| 8,443,994 | B1 | 5/2013 | Desselle |
| 8,469,213 | B2 | 6/2013 | Ishii et al. |
| 8,613,372 | B2 | 12/2013 | Porter |
| 8,636,160 | B2 | 1/2014 | Park |
| 8,695,822 | B2 | 4/2014 | Kwon |
| 8,720,716 | B2 | 5/2014 | Campbell |
| 8,919,546 | B2 | 12/2014 | Wada et al. |
| 9,010,555 | B2 | 4/2015 | Luzzato et al. |
| 9,108,774 | B2 | 8/2015 | Kwon |
| 9,327,883 | B2 | 5/2016 | Groubert et al. |
| 9,493,283 | B2 | 11/2016 | Tuyn |
| 9,643,762 | B2 | 5/2017 | Maguire |
| 9,828,146 | B2 | 11/2017 | Loukov |
| 9,850,044 | B2 | 12/2017 | Mühlemann |
| 9,932,159 | B2 | 4/2018 | Maguire |
| 9,975,677 | B2 | 5/2018 | Maguire |
| 10,647,486 | B2 | 5/2020 | Maguire |
| 10,654,625 | B2 | 5/2020 | Migas et al. |
| 10,800,581 | B2 | 10/2020 | Berroa Garcia |
| 10,836,544 | B2 | 11/2020 | Kim |
| 10,836,549 | B2 | 11/2020 | Maguire |
| 11,040,806 | B2 | 6/2021 | Naumann et al. |
| 2006/0096987 | A1 | 5/2006 | Wry |

| | | | | |
|---|---|---|---|---|
| 2006/0201904 | A1 | 9/2006 | Comeau et al. | |
| 2008/0197135 | A1 | 8/2008 | Berman | |
| 2009/0236304 | A1 | 9/2009 | Watson | |
| 2009/0236341 | A1 | 9/2009 | McKinney et al. | |
| 2009/0255962 | A1 | 10/2009 | Dressel | |
| 2010/0005641 | A1* | 1/2010 | Druitt | B65D 50/061 |
| | | | | 215/237 |
| 2010/0206879 | A1 | 8/2010 | Lin | |
| 2011/0000871 | A1 | 1/2011 | Bernard et al. | |
| 2011/0062159 | A1 | 3/2011 | Khubani | |
| 2011/0114593 | A1 | 5/2011 | Ishii et al. | |
| 2011/0278216 | A1 | 11/2011 | Hull et al. | |
| 2011/0297682 | A1* | 12/2011 | Kwon | B65D 51/16 |
| | | | | 220/268 |
| 2012/0024815 | A1 | 2/2012 | Kwon | |
| 2012/0285921 | A1 | 11/2012 | Kwon | |
| 2012/0298666 | A1 | 11/2012 | Kwon | |
| 2013/0001185 | A1 | 1/2013 | Antier et al. | |
| 2016/0243735 | A1 | 8/2016 | Cerveny | |
| 2017/0203896 | A1 | 7/2017 | Maguire | |
| 2017/0210516 | A1 | 7/2017 | Tebbe et al. | |
| 2017/0354289 | A1 | 12/2017 | Marina et al. | |
| 2017/0362003 | A1 | 12/2017 | Maguire | |
| 2018/0170625 | A1 | 6/2018 | Sing | |
| 2018/0370701 | A1 | 12/2018 | Maguire | |
| 2019/0375555 | A1 | 12/2019 | Edie et al. | |
| 2020/0207525 | A1* | 7/2020 | Sung | B65D 47/0871 |
| 2022/0267052 | A1* | 8/2022 | Dreyer | B65D 41/3447 |
| 2022/0340339 | A1 | 10/2022 | Naumann et al. | |

FOREIGN PATENT DOCUMENTS

| | | | | |
|---|---|---|---|---|
| CN | 1631740 | A | 6/2005 | |
| CN | 1631741 | A * | 6/2005 | B65D 41/38 |
| CN | 1830730 | A | 9/2006 | |
| CN | 101790447 | A | 7/2010 | |
| DE | 15 86 727 | A1 | 11/1970 | |
| DE | 93 18 243 | U1 | 3/1994 | |
| DE | 10 2010 028 521 | A1 | 11/2011 | |
| EP | 0 810 952 | B1 | 11/1998 | |
| EP | 1 406 820 | B1 | 4/2004 | |
| EP | 1 529 736 | A2 | 5/2005 | |
| EP | 1 951 590 | B1 | 8/2008 | |
| EP | 1 961 669 | A2 | 8/2008 | |
| EP | 2 331 418 | B1 | 6/2011 | |
| EP | 2 308 772 | A1 | 5/2012 | |
| EP | 2 574 182 | B1 | 2/2014 | |
| EP | 2 504 249 | B1 | 3/2015 | |
| EP | 3 135 600 | A1 | 3/2017 | |
| EP | 3 277 598 | A1 | 2/2018 | |
| EP | 3 336 003 | A1 | 6/2018 | |
| ES | 2712094 | A1 * | 5/2019 | B65D 47/0842 |
| FR | 2 499 519 | A1 | 8/1982 | |
| FR | 2 777 542 | B1 | 5/2000 | |
| FR | 2 785 264 | A1 | 5/2000 | |
| GB | 103 000 | A | 1/1917 | |
| GB | 809 398 | A | 2/1959 | |
| GB | 2 228 474 | A | 8/1990 | |
| JP | H10-194316 | A | 7/1998 | |
| JP | 2001-072120 | A | 3/2001 | |
| JP | 2003-191993 | A | 7/2003 | |
| JP | 2005-059876 | A | 3/2005 | |
| JP | 2005-289488 | A | 10/2005 | |
| JP | 2006-016072 | A | 1/2006 | |
| JP | 2006-143321 | A | 6/2006 | |
| JP | 2010018290 | A * | 1/2010 | B65D 41/325 |
| JP | 2011-111192 | A | 6/2011 | |
| JP | 4906441 | B2 | 3/2012 | |
| JP | 2013517995 | A * | 5/2013 | B65D 55/16 |
| JP | 5215798 | B2 | 6/2013 | |
| JP | 5330921 | B2 | 10/2013 | |
| JP | 5330922 | B2 | 10/2013 | |
| JP | 5341729 | B2 | 11/2013 | |
| JP | 2014-031202 | A | 2/2014 | |
| JP | 5520768 | B2 | 6/2014 | |
| JP | 5552346 | B2 | 7/2014 | |
| JP | 5574582 | B2 | 8/2014 | |
| JP | 5590913 | B2 | 9/2014 | |
| JP | 5600418 | B2 | 10/2014 | |

(56) References Cited

FOREIGN PATENT DOCUMENTS

| | | | | | |
|---|---|---|---|---|---|
| JP | 5600461 | B2 | 10/2014 | | |
| JP | 5697505 | B2 | 4/2015 | | |
| JP | 5948181 | B2 | 7/2016 | | |
| JP | 6068899 | B2 | 1/2017 | | |
| JP | 6081738 | B2 | 2/2017 | | |
| KR | 10-0855086 | B1 | 8/2008 | | |
| KR | 10-0855087 | B1 | 8/2008 | | |
| KR | 10-0872159 | B1 | 1/2009 | | |
| KR | 10-0880006 | B1 | 1/2009 | | |
| KR | 10-0894341 | B1 | 4/2009 | | |
| KR | 10-0942642 | B1 | 2/2010 | | |
| KR | 10-2010-029797 | A | 3/2010 | | |
| KR | 100981240 | B1 * | 9/2010 | ............ | B65D 55/16 |
| TW | 201704106 | A | 2/2017 | | |
| WO | WO 90/14286 | A1 | 11/1990 | | |
| WO | WO 1990/014286 | A1 | 11/1990 | | |
| WO | WO 94/04426 | A1 | 3/1994 | | |
| WO | WO 96/26122 | A1 | 8/1996 | | |
| WO | WO 1996/026122 | A1 | 8/1996 | | |
| WO | WO 00/26108 | A1 | 5/2000 | | |
| WO | WO 2007/057659 | A1 | 5/2007 | | |
| WO | WO 2007/058440 | A1 | 5/2007 | | |
| WO | WO 2008/147104 | A1 | 12/2008 | | |
| WO | WO 2009/002057 | A2 | 12/2008 | | |
| WO | WO 2009/048273 | A2 | 4/2009 | | |
| WO | WO 2010/004919 | A1 | 1/2010 | | |
| WO | WO 2010/040961 | A1 | 4/2010 | | |
| WO | WO 2011/064489 | A1 | 6/2011 | | |
| WO | WO 2011/090278 | A2 | 7/2011 | | |
| WO | WO 2011/093597 | A2 | 8/2011 | | |
| WO | WO 2011/096647 | A2 | 8/2011 | | |
| WO | WO 2011/138137 | A1 | 11/2011 | | |
| WO | WO 2012/121385 | A1 | 9/2012 | | |
| WO | WO 2014/200165 | A1 | 12/2014 | | |
| WO | WO 2015/046889 | A1 | 4/2015 | | |
| WO | WO 2015/061834 | A1 | 5/2015 | | |
| WO | WO 2016/182305 | A1 | 11/2016 | | |
| WO | WO 2017/068151 | A1 | 4/2017 | | |
| WO | WO 2018/088723 | A1 | 5/2018 | | |
| WO | WO 2018/111052 | A1 | 6/2018 | | |
| WO | WO 2019/031779 | A1 | 2/2019 | | |
| WO | WO 2019/207119 | A2 | 10/2019 | | |
| WO | WO 2019/207148 | A1 | 10/2019 | | |
| WO | WO 2019/207149 | A1 | 10/2019 | | |
| WO | WO 2019/207152 | A1 | 10/2019 | | |
| WO | WO 2019/207153 | A2 | 10/2019 | | |
| WO | WO 2020/037089 | A1 | 2/2020 | | |
| WO | WO 2020/077162 | A1 | 4/2020 | | |
| WO | WO 2020/212426 | A1 | 10/2020 | | |
| WO | WO 2021/013370 | A1 | 1/2021 | | |
| WO | WO-2022136054 | A1 * | 6/2022 | ............ | B65D 41/34 |

OTHER PUBLICATIONS

International Search Report and Written Opinion for International Application No. PCT/CA2020/051321, mailed Dec. 10, 2020.
International Preliminary Report on Patentability for International Application No. PCT/CA2020/051321, mailed Apr. 21, 2022.

* cited by examiner

CLOSURE DEVICE FOR CONTAINER

CROSS-REFERENCE TO RELATED APPLICATIONS

This application is a national stage filing under 35 U.S.C. § 371 of International Patent Application No. PCT/CA2020/051321 filed Oct. 2, 2020, entitled "CLOSURE DEVICE FOR CONTAINER" which claims the benefit under 35 U.S.C. § 119(e) to U.S. Provisional Application Ser. No. 62/913,926, filed Oct. 11, 2019, each of which is incorporated herein by reference in its entirety.

TECHNICAL FIELD

The present technology relates to a closure device for a container.

BACKGROUND

Containers, such as bottles, are generally provided with closure devices, such as caps, to fluidly seal the container. In recent years, it has become desirable to tether the closure device to the container in order to avoid losing the closure device. Not only is this a matter of convenience, but it is also becoming a legal requirement in certain jurisdictions for environmental reasons.

Tethering of a closure device to its respective container includes certain mechanisms which allow an attachment of the closure device to a tamper-evidence (TE) band at an open end of the container. Such mechanisms generally allow severing of frangible links between the closure device and the TE band during opening of the closure device yet allow the closure device to stay connected to the TE band and hence the container when in the open configuration. The typical mechanism also allows the closure device to be actuated between closed and open configurations.

In JP 5574582, there is described a cap 2 having a tongue 46 provided between two leashes. The tongue 46 abuts an annular ring 68 of the neck, allowing the cap to remain in the open position.

U.S. Pat. No. 9,010,555 describes a one-piece cap with two lines of weakness (20/34) which break when unscrewing the cap. The top portion of the cap remains attached to the TE band via the strip 36. A notch 32 separates the bridges 301 and 302. However, there is no mechanism to maintain the cap in the open position.

In U.S. Pat. No. 6,474,491, there is described a cap having a tongue 21 between the two film hinges 5. The two film hinges 5 are connected to the ring 3 via a respective arm 4. The tongue can abut the neck of the container when the cap is in the open position, allowing the cap to remain in the open position.

US 2012/0024815 describes a one piece cap comprising a cut line 34 under a hinge 35 to extend a coupling length of the support ring 33 with the cap body 31. In some embodiments, the cap body 31 includes a wedge kl, which when opened, is retained between the support step 15 and the support ring 33.

In JP 49096441, a cap is described with two bands 40 acting as a hinge between the TE band 20 and the cap body 10. A hook 11 is provided between the bands 40. When the cap body 10 is removed, the hook 11 engages the TE band 20 and the jaw A of the neck portion.

SUMMARY

Embodiments of the present technology have been developed based on inventors' appreciation of at least one shortcoming associated with the prior art solutions and approaches to retaining a closure device on a container and allowing retention of an open position of the closure device relative to the container.

Accordingly, in certain aspects and embodiments of the present disclosure, there is provided a closure device which can actuate between a closed configuration and an open configuration. An arrangement of leashes connecting a cap body to a tamper evidence (TE) band facilitates retention of the cap body in a fully open position.

From one aspect, there is provided a closure device for a container. The container defines a neck and an annular flange positioned along an exterior surface of the neck. The closure device comprises a cap body, a tamper evidence (TE) band that is positioned below the annular flange when the closure device is positioned on the neck of the container, a tongue that extends from the cap body towards the tamper evidence band and a first leash and a second leash positioned on either side of the tongue. The first leash and the second leash connect the cap body to the tamper evidence (TE) band, and allow the cap body to be removed from the neck of the container while remaining attached to the tamper evidence (TE) band. When the cap body is actuated to a fully open position the first leash and the second leash act as a torsion spring such that the tongue exerts a force against the neck of the container for retaining the cap body in the fully open position.

In certain embodiments, the tongue exerts a force directly against the neck of the container when the cap body is actuated to the fully open position.

In certain embodiments, the tongue exerts a force on the neck of the container at a position between the annular flange and an opening of the container when the cap body is actuated to the fully open position.

In certain embodiments, the tongue comprises a projecting lip that defines a contact surface between the tongue and the exterior surface of the neck when the cap body is actuated to the fully open position.

In certain embodiments, the projecting lip is a first projecting lip and the tongue further comprises a second projecting lip. The first projecting lip and the second projecting lip together define a contact surface between the tongue and the exterior surface of the neck when the cap body is actuated to the fully open position.

In certain embodiments, the first projecting lip is positioned at a free end of the tongue and the second projecting lip is positioned at a root end of the tongue.

In certain embodiments, the first leash and the second leash connect to the cap body 14 in proximity to the root end of the tongue.

In certain embodiments, the tongue comprises a rib extending between the first projecting lip and the second projecting lip.

In certain embodiments, at least one frangible link connects the cap body to the tamper evidence band. The at least one frangible link is more fragile than the leash.

In certain embodiments, at least one frangible bridge connects the first leash and the second leash to the tamper evidence (TE) band. The at least one frangible bridge is more fragile than the leash.

In certain embodiments, the first leash and the second leash each comprise a first portion and a second portion, the first portion and the second portion being positioned at an angle in relation each other when the closure device is in a fully closed position.

In certain embodiments, the first portion of each of the first leash and the second leash is formed within the tamper evidence (TE) band.

In certain embodiments, the first leash and the second leash undergo twisting as the cap body moves from a closed position to the fully open position.

In certain embodiments, the first leash and the second leash are sized to allow the cap body to be removed from the neck of the container.

In certain embodiments, the cap body is positioned at an angle of 90° to 180° in relation to the container when in the fully open position.

In certain embodiments, the cap body is retained in a closed position on the container by means of a threaded interface with the neck.

In certain embodiments, from the fully open position, the cap body is configured to be actuated back to a closed configuration and be retained in the closed configuration via the threaded interface.

From another aspect, there is provided a mold for forming a closure device by injection molding, the mold comprising a female cavity piece and a male core piece, the female cavity piece and the male core piece defining a molding cavity configured to form the closure device of claim 1.

These and other aspects and features of non-limiting embodiments will now become apparent to those skilled in the art upon review of the following description of specific non-limiting embodiments in conjunction with the accompanying drawings.

DETAILED DESCRIPTION OF THE DRAWINGS

The non-limiting embodiments will be more fully appreciated by reference to the accompanying drawings, in which.

Figure 1:
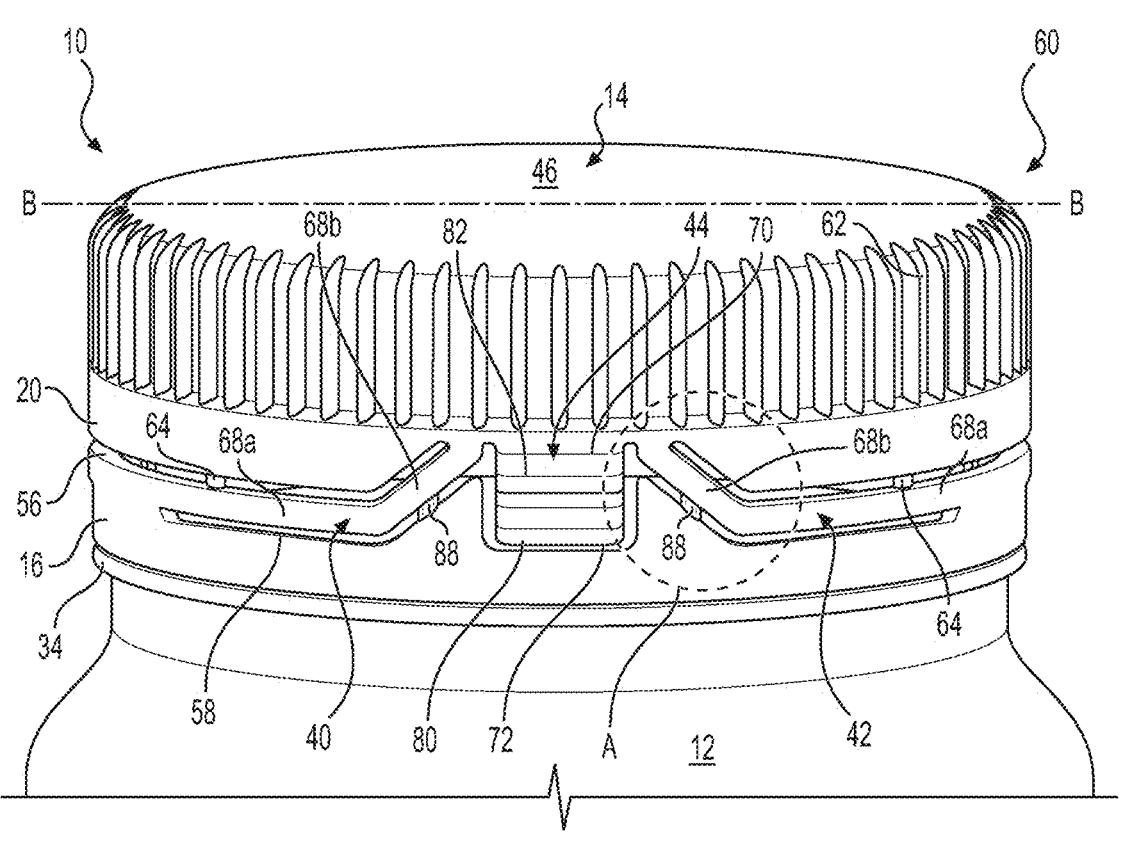
FIG. 1 is a front perspective view of a closure device mounted on a container when the closure device is in a closed and locked configuration, in accordance with some non-limiting embodiments of the present technology.
Figure 6A:
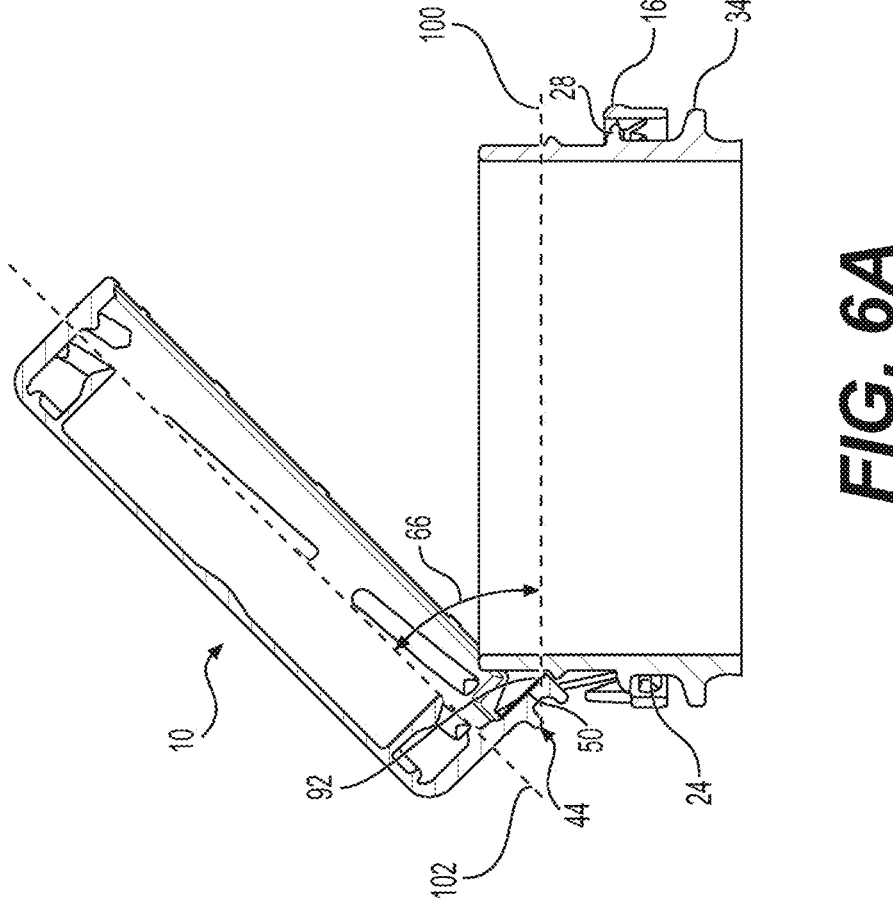
Figure 6B:
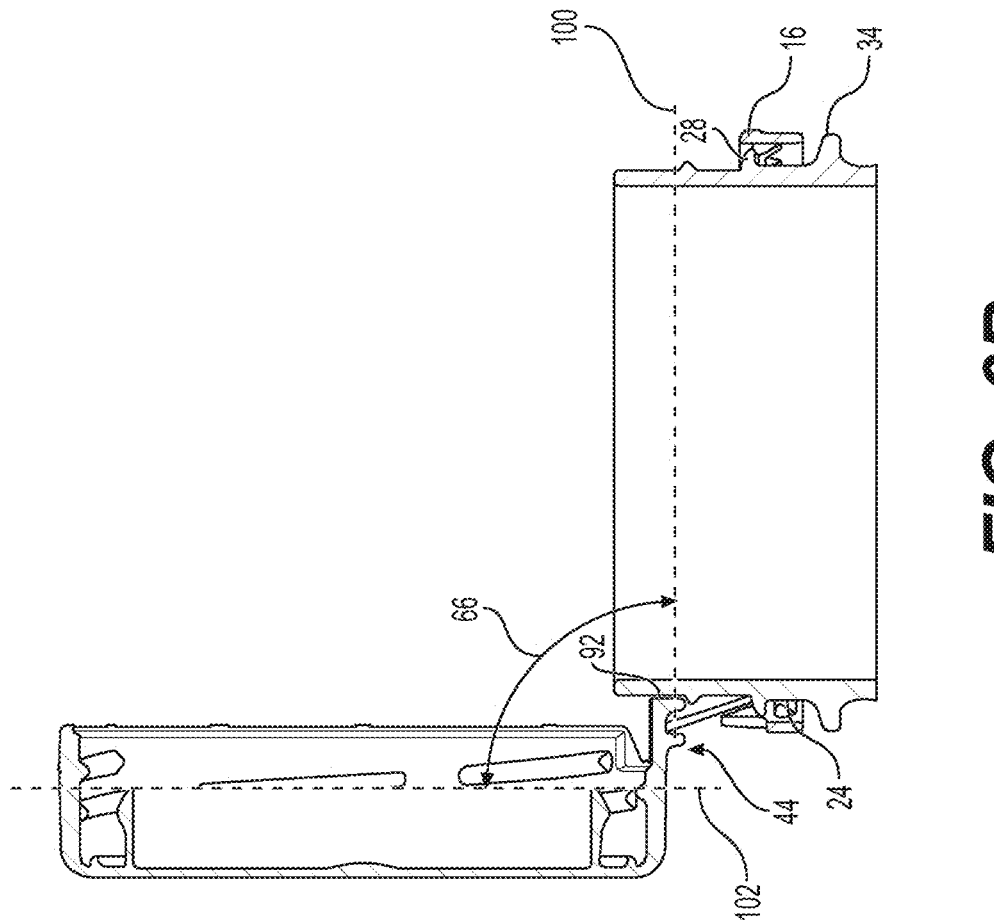
Figure 6C:
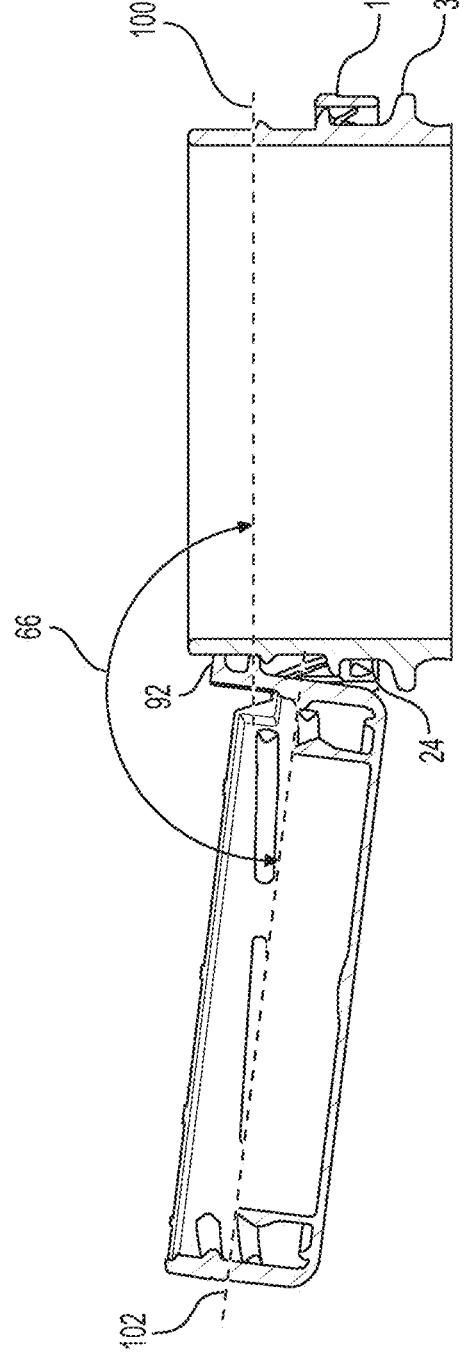
Figure 7:
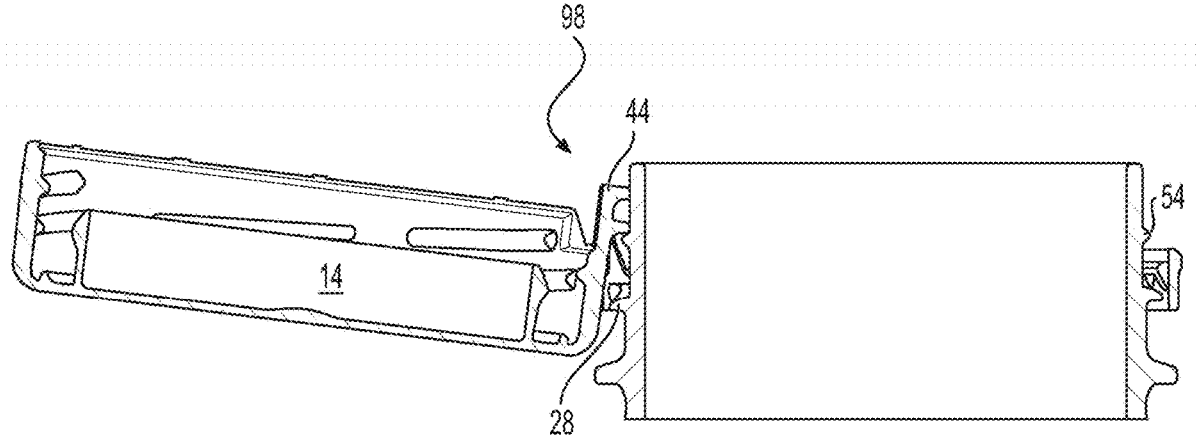
Figure 8:
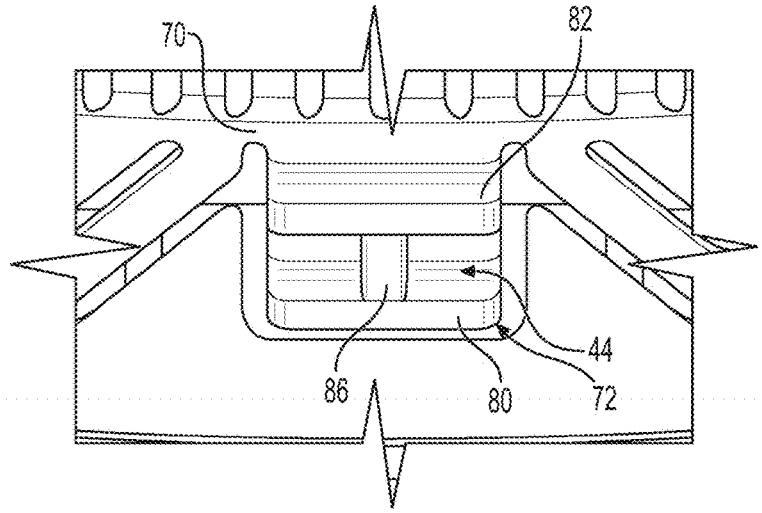

FIGS. 6A, 6B and 6C respectively depict perspective sectional views of the closure device of FIG. 1 in different open positions, in accordance with some non-limiting embodiments of the present technology;

FIG. 7 shows a perspective sectional view of the closure device of FIG. 1 in a fully open position, in accordance with some non-limiting embodiments of the present technology; and FIG. 8 is an enlarged view of an alternative embodiment of a tongue that could form part of the closure device of FIG. 1, in accordance with some non-limiting embodiments of the present technology.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Reference will now be made in detail to various non-limiting embodiment(s) of a closure device for a container. It should be understood that other non-limiting embodiment(s), modifications and equivalents will be evidence to one of ordinary skill in the art in view of the non-limiting embodiment(s) disclosed herein and that these variants should be within the scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Referring initially to FIG. 1, there is provided a closure device 10 for a container 12. The container 12 with which the closure device 10 is useable is not limited in its use, configuration or material. In the embodiments illustrated herein, the container 12 is a bottle, such as a beverage bottle made of polyethylene terephthalate (PET). For example, the container 12 can be a blow-molded bottle for containing still water beverage or another flat beverage. Alternatively, the container 12 can be for a carbonated beverage. In yet further embodiments, the container 12 can be for a hot fill type of beverage (such as a drinkable yogurt, a fruit juice, or the like). However, the closure device 10 can be used with other types of containers as well.

In accordance with non-limiting embodiments of the present technology, the closure device 10 comprises a cap body 14, a tamper evidence band (TE band) 16, a first leash 40, a second leash 42 and a tongue 44 positioned between the first leash 40 and the second leash 42. The closure device 10 is sized and shaped to be received around a neck 24 of the container 12. The first leash 40 and the second leash 42 are configured to connect the cap body 14 to the TE band 16 and allow the cap body 14 to be removed from the neck 24 of the container 12 while still remaining attached to the TE band 16.

The closure device 10 is generally cylindrical in shape and has a closed first end 46 and an open second end 48. An outer surface 60 of the cap body 14 is textured to facilitate gripping of the cap body 14. In accordance with the non-limiting embodiment shown in FIGS. 1 and 2, the texturing comprises a plurality of ribs 62 (also known as "knurls") extending in a direction between the first and second ends 46, 48 of the closure device 10. It should be noted that the sizing and the pattern of the plurality of ribs 62 is not limited to those depicted herein. It is also noted that in alternative embodiments of the present technology, the plurality of ribs 62 can be omitted altogether.

In order to provide access to the contents of the container 12, the cap body 14 is movable between a fully closed position, shown in FIGS. 1 through 4, and a fully open position shown in FIGS. 6C and 7. When in the fully closed position, the cap body 14 is retained on the neck 24 of the container 12 such that it closes and fluidly seals the container 12. In the fully open position, the cap body 14 is removed from the neck 24 of the container 12 and enables access to the contents of the container 12. The cap body 14 is re-closable, meaning that the cap body 14 may be actuated from the fully closed position to the fully open position, as well as from the fully open position back to the fully closed position.

Figure 4:
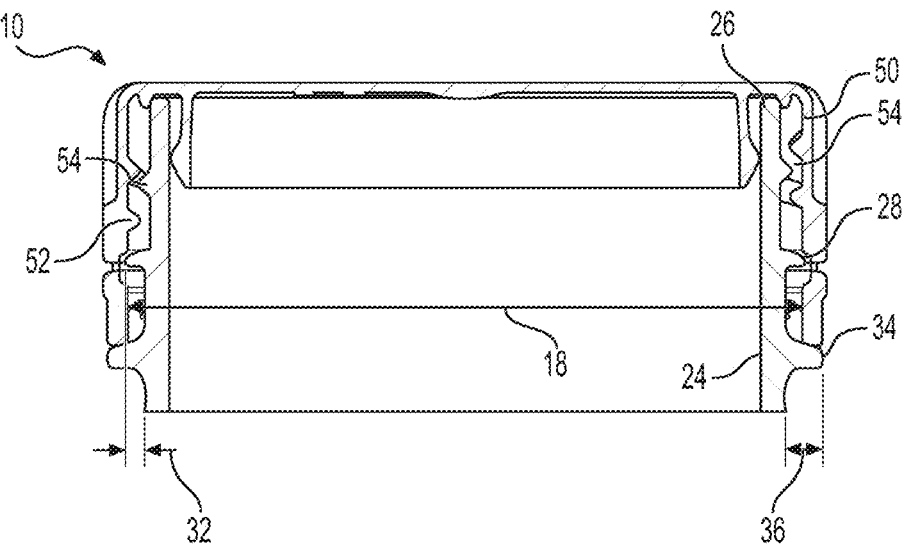
FIG. 4 is a sectional view of the closure device of FIG. 1 mounted on a container, when the closure device is in a closed and locked configuration, in accordance with some non-limiting embodiments of the present technology, the sectional view having been taken through line B-B of FIG. 1.

As shown in FIG. 4, the neck 24 of the container 12 comprises an exterior surface 30 and an to open end 26. Extending around the exterior surface 30 of the neck 24 are threads 54, an annular flange 28 (also referred to as a "tamper-evidence bead") and a support ledge 34. The annular flange 28 is spaced from the open end 26 of the container 12 and protrudes by a first distance 32 from the exterior surface 30 of the neck 24. The support ledge 34 is spaced further from the open end 26 of the container 12 than the annular flange 28 and protrudes by a second distance 36 from the exterior surface 30 of the neck 24. The second distance 36 of the support ledge 34 is larger than the first distance 32 of the annular flange 28. A diameter 18 of the TE band 16 of the closure device 10 is less than a diameter 41 of the neck 24 at the support ledge 34, which serves to retain the closure device 10 above the support ledge 34 at the neck 24 of the container 12. In other words, a movement of the TE band 16 away from the open end 26 of the container 12 is delimited by the support ledge 34.

The TE band 16 of the closure device 10 is further configured to interact with the annular flange 28 of the container 12 in order to retain the TE band 16 on the container 12. As shown in FIG. 4, the TE band 16 is positioned below the annular flange 28 and more particularly, between the annular flange 28 and the support ledge 34. The first distance 32 of the annular flange 28 is such that it retains the TE band 16 between the annular flange 28 and the support ledge 34. As will be described in more detail below, the TE band 16, together with the first leash 40 and second leash 42, maintains the cap body 14 attached to the container 12 throughout its articulation from the fully closed position to the fully open position.

With continued reference to FIG. 4, the cap body 14 of the closure device 10 is maintained in the closed position by means of a threaded interface with the neck 24. An inner surface 50 of the cap body 14 has threads 52 defined therein which are arranged to cooperate with the threads 54 on the exterior surface 30 of the neck 24 of the container 12. In alternative embodiments (not shown), the closure device 10 and the neck 24 do not include threads and instead the cap body 14 and the neck 24 are sized and shaped to snap-fit together to close the open end 26 of the container 12.

Figure 3:
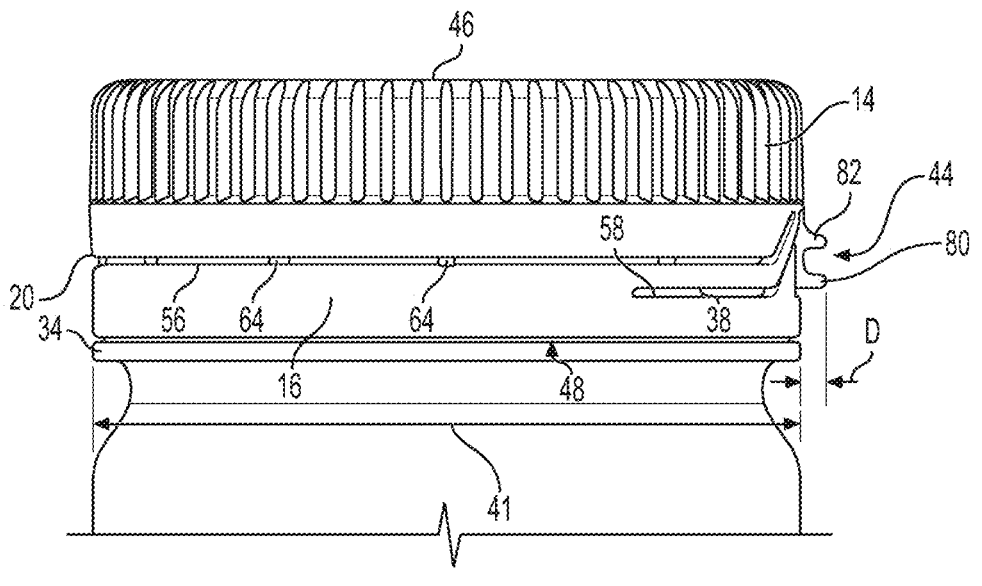
FIG. 3 is a side view of the closure device of FIG. 1 when the closure device is in the closed and locked configuration, in accordance with some non-limiting embodiments of the present technology.

The TE band 16 and the cap body 14 are initially (i.e. prior to a first use) frangibly attached in a manner that allows them to be at least partially separable from one another. As best shown in FIG. 3, the cap body 14 is frangibly connected to the TE band 16 by a plurality of frangible bridges 64 positioned between a rim 20 of the cap body 14 and an upper edge 56 of the TE band 16. The frangible bridges 64 are arranged to be severed by rotational movement of the cap body 14 relative to the TE band 16. A tensile strength of the frangible bridges 64 is lower than a tensile strength of the TE band 16, which means that the frangible bridges 64 will be severed before tensile damage to the TE band 16 occurs.

When in the closed position, the cap body 14 may be in an initial "locked" closed configuration or a subsequent "unlocked" closed configuration. Prior to a first opening, the cap body 14 is initially in a "locked" closed configuration, where the cap body 14 is retained on the neck 24 of the container 12 (via the threads 52, 54) and the frangible bridges 64 are intact and thus connect the cap body 14 to the TE band 16. As is known in the art, when the frangible bridges 64 are intact, the TE band 16 and the cap body 14 provide a "tamper indication" that shows that the container 12 has not been previously opened.

In contrast, once the cap body 14 has been actuated to an open position, and is then returned to the closed position, the closure device 10 is in an "unlocked" closed configuration. In the "unlocked" closed configuration, the cap body 14 is retained on the neck 24 of the container 12 (i.e. via the threads 52, 54) but is not connected to the TE band 16 by one or more of the frangible bridges 64 since the frangible bridges 64 were previously broken or severed when the cap body was actuated to an open position. As is known in the art, when the frangible bridges 64 are broken or severed, the TE band 16 and the cap body 14, provide a "tamper indication" that shows that that the container 12 has been previously opened.

The actuation of the cap body 14 from the closed position (either from the locked closed configuration or the unlocked closed configuration) to the open position, is generally referred to herein as an action of "opening" the closure device 10. The actuation of the cap body 14 from an open position to a closed position (which will now be an unlocked closed configuration) is generally referred to herein as an action of "closing" the closure device 10.

In the "unlocked" closed configuration, the frangible bridges 64 are severed but the cap body 14 remains connected to the TE band 16 by means of the first leash 40 and the second leash 42. More specifically, the first and second leashes 40, 42 allow partial separation of the cap body 14 from the TE band 16 during opening whilst maintaining the cap body 14 connected to the TE band 16. The first and second leashes 40, 42 are sized and shaped to allow the cap body 14 a degree of rotational and translational freedom sufficient to enable it to be removed from the neck 24 of the container 12 (as shown in FIG. 5B, for example).

In addition to the frangible bridges 64, frangible bridges 88 are provided between a bottom edge 38 of the first and second leashes 40, 42 and an indented edge 58 of the TE band 16. In the non-limiting embodiment shown in FIG. 1, two frangible bridges 88 are provided, with one frangible bridge 88 connecting each of the first and second leashes 88 to the indented edge 58 of the TE band 16. It is to be understood that more or fewer frangible bridges 88 may be provided in different embodiments. During rotational actuation of the cap body 14 from the locked configuration to the unlocked configuration, the frangible bridges 88 of the closure device 10 break or are severed. A tensile strength of the frangible bridges 88 is lower than a tensile strength of the first and second leashes 40, 42.

Figure 5A:
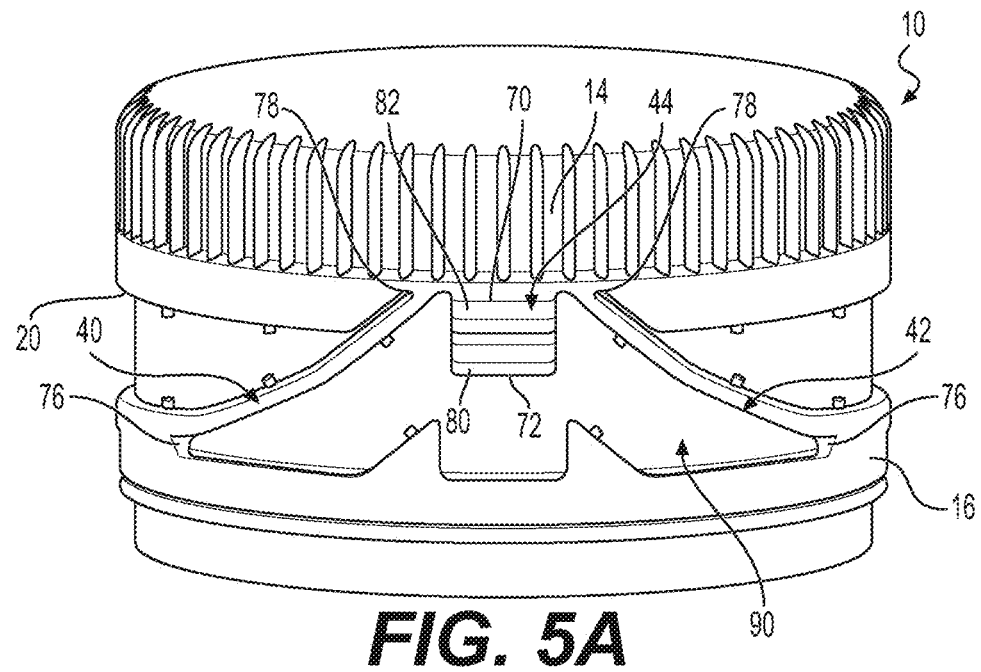
FIGS. 5A and 5B are front perspective views of the closure device of FIG. 1 in various positions on the container as the closure device moves towards an open position, in accordance with some non-limiting embodiments of the present technology.
Figure 5B:
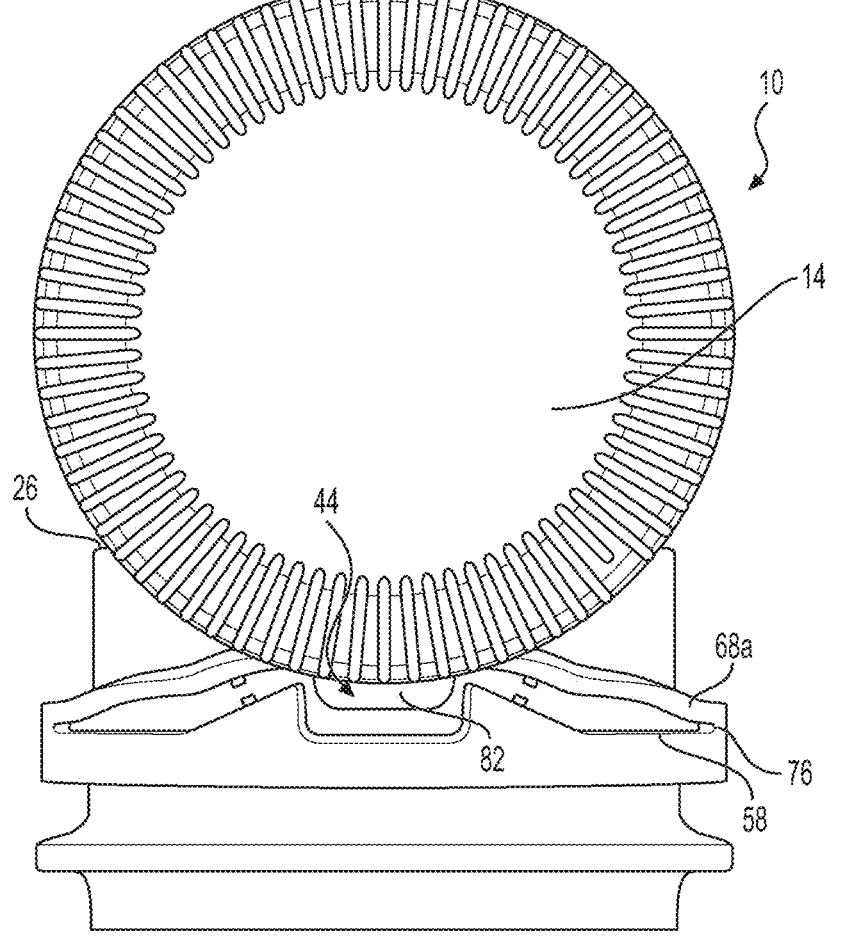

Referring now to FIG. 5A, as the cap body 14 rotates about the threads 54 and moves towards the open end 26 of the container 12 and away from the TE band 16, the frangible bridges 88 sever causing a separation of the first and second leashes 40, 42 from the indented edge 58 of the TE band 16. The separation defines an opening 90 between the first and second leashes 40, 42 and the indented edge 58 of the TE band 16. In a non-limiting embodiment, the opening 90 is sized and shaped to receive at least a portion of the annular flange 28 of the container 12.

The size and shape of the leashes 40, 42 allows a degree of rotational and translational movement of the cap body 14 in relation to the TE band 16 to break or sever the frangible bridges 64 and the frangible bridges 88.

As will be described in more detail below, the first and second leashes 40, 42, together with the tongue 44 facilitate retention of the cap body 14 in the fully open position.

As shown in FIGS. 1, 5A and 5B, the tongue 44 is positioned between the first leash 40 and the second leash 42 and extends from the cap body 14 towards the TE band 16. The tongue 44 comprises a root end 70 connected to the cap body 14 and a free end 72 separated from the root end 70. The root end 70 of the tongue 44 is positioned inwardly of the rim 20 towards the closed end 46 of the cap body 14. The free end 72 of the tongue 44 extends away from the closed end 46 of the cap body, such that when the cap body 14 is in the fully closed position, the free end 72 of the tongue extends past the upper edge 56 of the TE band 16. In the non-limiting embodiment shown, the free end 72 extends to a position that is flush with the indented edge 58 of the TE band 16.

The tongue 44 further comprises a first radially projecting lip 80 positioned at the free end 72 of the tongue 44 and a second radially projecting lip 82 positioned at the root end 70 of the tongue 44. As shown in FIG. 3, the first and second radially extending lips 80, 82 (hereafter "lips") extend from the outer surface 60 of the cap body 14 by a distance D. By way of a non-limiting example, the distance D may be between 0.7 to 1.5 mm. In the embodiment shown, both the lips 80, 82 extend by the same distance D from the outer surface 60 of the cap body 14. However, it should be understood that each of the lips 80, 82 may extend by different distances D from the outer surface 60 of the cap body 14. For example, the first radially projecting lip 80 may extend by a greater distance D than the second radially projecting lip 82.

As will be explained in more detail below, when the cap body 14 is actuated from the closed position to the fully open position, an interaction between the tongue 44 and the exterior surface 30 of the neck 24 of the container 12 helps to retain the cap body 14 in the fully open position. More specifically, an interaction between one or more of the first and second radially projecting lips 80, 82 and the exterior surface 30 of the neck 24 of the container 12, facilitates retention of the cap body 14 in the fully open position.

The first and second leashes 40, 42 (hereafter "leashes") are spaced from one another circumferentially around a perimeter of the closure device 10, with the tongue 44 positioned between the two leashes 40, 42. As best shown in FIG. 5A, the leashes 40, 42 each connect to the TE band 16 at a respective first connection point 76 and to the cap body 14 at a respective second connection point 78. In the non-limiting embodiment shown, the second connections points 78 are located in proximity to the root end 70 of the tongue 44, with one on either side of the tongue 44.

Referring back to FIG. 1, the leashes 40, 42 each comprise a first portion 68a and a second portion 68b, with the first portions 68a being formed within the TE band 16. More specifically, the first portions 68a are formed below the upper edge 56 of the TE band. It should, however, be understood that the first portions 68a may alternatively be formed within the cap body 14, such that they are formed above the rim 20 of the cap body 14.

In accordance with a non-limiting embodiment, when the closure device 10 is in the fully closed position, the first portion 68a and the second portion 68b of the leashes 40, 42 are positioned at an angle in relation to each other. More specifically, first portion 68a lies in a plane substantially parallel to the upper edge 56 of the TE band, while second portion 68b extends at an angle from that plane towards the root end 70 of the tongue 44.

Figure 2:
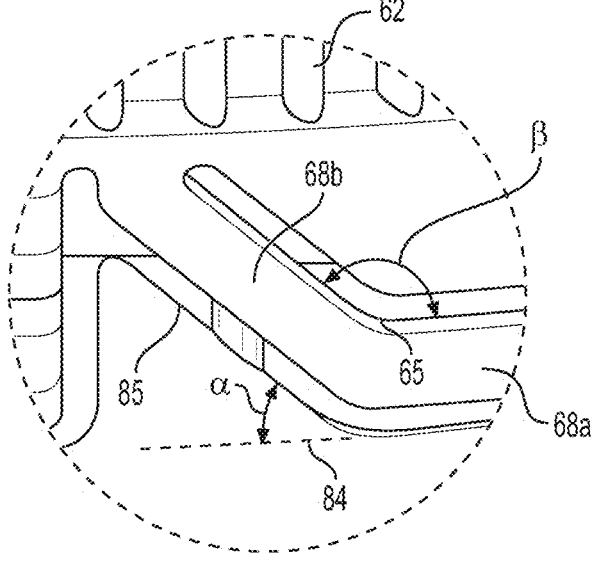
FIG. 2 is an enlarged view of section A of the closure device of FIG. 1 when the closure device is in the closed and locked configuration, in accordance with some non-limiting embodiments of the present technology.

As shown in FIG. 2, which is an enlarged view of section A of FIG. 1, an angle α is defined between a dashed line 84 representing an extension of the indented edge 58 of the TE band 16 and an angled edge 85 of the TE band 16. By way of non-limiting example, the angle α may be between 20-45 degrees.

An inflection region 65 forms a transition between the first portion 68a and the second portion 68b of each leash 40, 42. With reference to FIG. 2, when the cap body 14 is in the fully closed position, the inflection region defines an angle β between the first portion 68a and the second portion 68b. The angle β may be between 135-160 degrees, by way of non-limiting example. It should be understood that the inflection region 65 may be configured as a sharp corner or a softer rounded corner, among other possibilities.

As shown in FIG. 5A, as the cap body 14 moves towards the upper end 26 of the container and separates from the TE band 16, the leashes 40, 42 elongate and stretch between the TE band 16 and the cap body 14. As they stretch, the angle β between the first portions 68a and second portion 68b expands towards 180 degrees, such that when leashes 40, 42 are fully extended, they together form a substantially linear, straight leash.

While leashes 40, 42 are described above as comprising two portions 68a, 68b divided by an inflection region 65, in an alternative embodiment, leashes 40, 42 may be straight leashes with no inflection region 65, and may instead extend diagonally in a linear fashion between their first and second connection points 76, 78.

As will be explained in more detail below, when the cap body 14 is articulated to the fully open position, the leashes 40, 42 act as torsion bars (e.g. torsion springs) that help to retain the cap body 14 in the fully open position. More specifically, in the fully open position, the tongue 44 is configured to engage with the exterior surface 30 of the neck 24 of the container 12, and the leashes 40, 42 are configured to act as torsion bars or torsion springs that cause the tongue 44 to exert a force against the neck 24 of the container 12 so as to retain the cap body 14 in the fully open position. In certain embodiments, the tongue 44 exerts a force directly against the exterior surface 30 of the neck 24 with no additional structure positioned between the tongue 44 and the exterior surface of the neck 24.

The manner in which the cap body 14 is articulated from the fully closed position to the fully open position, and the resulting movement of the leashes 40, 42, will now be described in more detail with respect to FIGS. 5A-B, 6A-C and 7.

FIGS. 6A-C show the cap body 14 in various positions as it undergoes movement from a closed position towards the fully open position. The position of the cap body 14 at each position is defined by a positioning angle 66 between an axis 102 of the cap body 14 along a diametric plane of the cap body 14, and an axis 100 of the neck 24 of the container 12 along a diametric plane of the neck 24. In FIG. 6A, the cap body 14 has a positioning angle 66 which is less than 90 degrees (e.g. about 45 degrees). In FIG. 6B, the cap body 14 has a positioning angle 66 which is approximately 90 degrees, and in FIG. 6C, where the cap body 14 is in its fully open position, the cap body 14 has a positioning angle 66 of between 160-180 degrees. It should however be appreciated that in alternative embodiments, the positioning angle 66 of the cap body 14 in the fully open position may be anywhere between 90-180 degrees.

As shown in FIG. 5A, as the cap body 14 rotates about the threads 54 it translates upwards along the neck 24 of the container towards the open end 26 of the container 12. As it does so, the leashes 40, 42 stretch between the TE band 16, which is held in place by the annular flange 28, and the cap body 14. As mentioned previously, the leashes 40, 42 are sized and shaped in order to permit the cap body to reach the open end 26 of the container 12, and be removed therefrom.

FIG. 6A shows the cap body 14 as it starts to be removed from the open end 26 of the container 12. As the cap body 14 is removed from the container 12 it undergoes a pivoting movement about a contact surface 92 between the tongue 44 and the exterior surface 30 of the neck 24. Specifically, the free end 72 of the tongue 44 abuts the exterior surface 30 of the neck 24, and creates a contact surface 92 (e.g. which may be a contact line or contact point) between the tongue 44 and the exterior surface 30 of the neck. The contact surface 92 between the tongue 44 and the exterior surface 30 defines a pivot axis or point about which the cap body 14 pivots.

When the cap body 14 is in the position shown in FIG. 6A, it is the inner surface 50 of the tongue 44 that first abuts the exterior surface 30 of the neck 24 and defines the contact surface 92. As the cap body 14 is articulated towards a positioning angle 66 of 90 degrees, as shown in FIG. 6B, the tongue 44 rolls or slips in relation to the exterior surface 30 of the neck 24, such that an under surface 98 of the tongue 44 then defines the contact surface 92 with the exterior surface 30 of the neck. Then, in FIG. 6C, when the cap body 14 is in the fully open position, it is the projecting lips 80, 82 that define the contact surface 92 with the exterior surface 30 of the neck 24.

It is to be understood that as the cap body 14 moves through various positioning angles 66, the portion of the tongue 44 (i.e. the inner surface 50, the under surface 98, and one or both of the projecting lips 80, 82) that contacts the exterior surface 30 of the neck 24, and thus defines the contact surface 92, changes. As such, the pivot axis or point defined by the contact surface 92 is a floating axis or point that moves along the exterior surface 30 of the neck during articulation of the cap body 14. Therefore, the contact or movement of the tongue 44 in relation to the exterior surface 30 of the neck may involve rolling, slipping, pivoting as well as up-and-down or side-to-side translation.

Referring back to FIGS. 5A and 5B, as the cap body 14 pivots towards the fully open position, the leashes 40, 42 undergo a twisting motion. When the cap body 14 is in the position of FIG. 4A, prior to being pivoted, the leashes 40, 42 are in a neutral twist position. In other words, no torsion forces are applied to the leashes 40, 42. However, as the cap body 14 is articulated through various open positions (such as those depicted in FIGS. 6A-C), the leashes 40, 42 are twisted, meaning that a torsion force is applied to them. When the cap body 14 is in the position of FIG. 5B (or 6B), the leashes 40, 42 are twisted by approximately 90 degrees such that a torsion force commensurate with that angle of movement has been applied to the leashes. This torsion force causes mechanical energy to be stored within the leashes 40, 42. As the positioning angle 66 of the cap body 14 increases, so does the torsion force applied to the leashes 40, 42 and the amount of mechanical energy stored within the leashes 40, 42.

In the fully open position shown in FIGS. 6C and 7, the leashes 40, 42 have been twisted by an angle of between 160-180 degrees, equivalent to the positioning angle 66 of the cap body 14. As such, a torsion force commensurate with that angle of movement has been applied to the leashes 40, 42. As a result of the torsion forces, the leashes 40, 42 apply a torque in an opposite direction from the twisting direction, which is in a direction that pushes the tongue 44 against the neck 24 of the container 12. As such, the tongue 44 exerts a force against the neck 24 of the container 12 commensurate with the mechanical energy stored in the leashes 40, 42 from the torsion forces that have been applied. The force the tongue 44 exerts against the exterior surface 30 of the neck 24 of the container 12 assists in retaining the cap body 14 in the fully open position. In the specific, non-limiting embodiments shown in FIGS. 6C and 7, it is the projecting lips 80 and 82 that define the contact surface 92 with the neck 24 of the container 12, and that exert a force, resulting from the torque from the leashes 40, 42, against the neck 24 of the container 12.

In the non-limiting embodiment shown, the tongue 44 exerts a force on the neck of the container at a position above the annular flange 28, and more particularly at a position between the annular flange 28 and the open end 26 of the container.

It is also to be understood that the leashes 40, 42 are sized and shaped such that the torque that they exert after being twisted by any angle between 90-180 degrees is sufficient to assist in retaining the cap body 14 in the fully open position. In a specific non-limiting embodiment, the leashes are sized and shaped to provide sufficient toque when twisted by between 160-180 degrees, and in yet another specific non-limiting embodiment, the leashes 40, 42 are sized and shaped to provide sufficient torque when twisted by only 90-100 degrees. It would be well understood by a person of skill in the art how to size and shape the leashes 40, 42 in order to have them provide sufficient torque to maintain the cap body 14 in the open position depending on the desired positioning angle of the fully open position. In light of the above, it can be said that the leashes 40, 42, in combination with the tongue 44, function to maintain the closure device 10 in the fully open position, at least until a deliberate opposing force is applied to the cap body 14 to move the cap body 14 away from the fully open position.

In accordance with an alternative embodiment shown in FIG. 8, the tongue 44 may comprise a rib 86 that extends between the first projecting lip 80 and the second projecting lip 82. The rib 86 may be formed perpendicular or normal to the lips 80, 82. The rib 86 may extend from the outer surface 60 of the cap body 14 by the same distance D as one or both of the lips 80, 82. The presence of the rib 86 avoids having a thread 54 of the neck become lodged between the lips 80, 82 during opening of the container 12. If a thread 54 becomes lodged or stuck between the lips 80, 82, the cap body 14 may be restricted in terms of how much it can open (meaning, the cap body 14 may be limited to opening only 140 degrees, or less, for example) thus causing the cap body 14 to interfere with access to the open end 26 of the container 12. As such, the presence of the rib 86 blocks the ability of the threads 54 to become wedged or stuck between the lips 80, 82, such that the cap body 14 is able to be opened to its fully open position.

The closure device 10, including the cap body 14, TE band 16, leashes 40, 42 and tongue 44, may be integrally formed as a one-piece construction.

The closure device 10 according to the described embodiments may be of multiple different sizes and dimensions. Some non-limiting examples include closure devices 10 having an outer diameter of 29 mm and an inner diameter of 26 mm, or having an outer diameter of 26 mm and an inner diameter of 22 mm, among other possibilities. The closure device 10 according to the described embodiments may also be provided in larger sizes, such as those having outer diameters of 38 mm or 48 mm, among other possibilities.

In certain embodiments, the closure device 10 is made by injection molding using a mold adapted to form the closure device 10. The mold is positionable, in use, within an injection molding machine (not depicted). Injection molding machines are well known in the art and, as such, will not be described here at any length. A detailed description of these known injection molding machines may be referenced, at least in part, in the following reference books (for example): (i) "Injection Molding Handbook" authored by OSSWALD/ TURNG/GRAMANN (ISBN: 3-446-21669-2), (ii) "Injection Molding Handbook" authored by ROSATO AND ROSATO (ISBN: 0-412-10581-3), (iii) "Injection Molding Systems" 3rd Edition authored by JOHANNABER (ISBN 3-446-17733-7) and/or (iv) "Runner and Gating Design Handbook" authored by BEAUMONT (ISBN 1-446-22672-9).

A mold assembly for making the closure device 10 comprises a molding cavity defined, at least in part, by a female cavity piece and a male core piece (as well as, optionally, a number of additional molding components) mounted respectively on a cavity plate and a core plate of a mold. The molding cavity is arranged to receive heated molding material for making the closure device (in this embodiment PET pellets) injected under pressure in a molten state.

The cavity plate and the core plate are urged together and are held together by clamp force, the clamp force being sufficient enough to keep the cavity and the core pieces together against the pressure of the injected molding material. The molding cavity has a shape that substantially corresponds to a final cold-state shape of the closure device. The so-injected molding material is then cooled to a temperature sufficient to enable ejection of the so-formed closure device from the mold. When cooled, the molded closure device shrinks inside of the molding cavity and, as such, when the cavity and core plates are urged apart, the molded article can be demolded, i.e. ejected off of the core piece. Ejection structures are known to assist in removing the molded articles from the core halves. Examples of the ejection structures include stripper plates, ejector pins, etc.

The mold assembly is comprised of several plates, each plate housing a component of the mold assembly. More specifically, the mold assembly includes a cavity plate housing one or more cavity inserts and a core plate housing one or more cavity inserts. In certain embodiments, the mold assembly further includes a stripper assembly, which in case of the preform mold, may house one or more neck rings. The mold assembly may further include one or more plates associated with the hot runner, such as a manifold plate, a backing plate and the like.

Separations between the cap body 14 and the TE band 16, as well as between the leashes 40, 42 and the TE band 16 may be formed during the molding operation, or may be cut or slit into the closure device 10 in a post-molding operation.

It should be expressly understood that various technical effects mentioned throughout the description above need not be enjoyed in each and every embodiment of the present technology. As such, it is anticipated that in some implementations of the present technology, only some of the above-described technical effects may be enjoyed. While in other implementations of the present technology, none of the above enumerated technical effects may be present, while other technical effects not specifically enumerated above may be enjoyed. It should be expressly understood that the above enumerated technical effects are provided for illustration purposes only, to enable those skilled in the art to better appreciate embodiments of the present technology and by no means are provided to limit the scope of the present technology or of the claims appended herein below.

It is noted that the foregoing has outlined some of the more pertinent non-limiting embodiments. It will be clear to those skilled in the art that modifications to the disclosed non-embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. A closure device for a container, the container defining a neck and an annular flange positioned along an exterior surface of the neck, the closure device comprising:

a cap body;

a tamper evidence band that is positioned below the annular flange when the closure device is positioned on the neck of the container;

a tongue extending from the cap body towards the tamper evidence band, wherein a root end of the tongue is positioned inwardly of a rim of the cap body towards a closed end of the cap body; and a first leash and a second leash positioned on either side of the tongue and connecting the cap body to the tamper evidence band, the first leash and the second leash allowing the cap body to be removed from the neck of the container while remaining attached to the tamper evidence band, wherein when the cap body is actuated to a fully open position:

the first leash and the second leash act as a torsion bar such that the tongue exerts a force against the neck of the container for retaining the cap body in the fully open position;

the first leash and the second leash each comprise a first portion and a second portion, with the second portion being directly connected to the first portion, wherein when the closure device is in a fully closed position an entire bottom edge of the first portion lies in a plane substantially parallel to an upper edge of the tamper evidence band, and the second portion extends at an angle from the first portion into the cap body towards the root end of the tongue such that the second portion is positioned only at or above the entire bottom edge of the first portion.

2. The closure device of claim 1, wherein the tongue exerts a force directly against the neck of the container when the cap body is actuated to the fully open position.

3. The closure device of claim 1, wherein the tongue exerts a force on the neck of the container at a position between the annular flange and an open end of the container when the cap body is actuated to the fully open position.

4. The closure device of claim 1, wherein the tongue comprises a projecting lip, the projecting lip defining a contact surface between the tongue and the exterior surface of the neck when the cap body is actuated to the fully open position.

5. The closure device of claim 4, wherein the projecting lip is a first projecting lip, the tongue further comprising a second projecting lip, wherein the first projecting lip and the second projecting lip together define the contact surface between the tongue and the exterior surface of the neck when the cap body is actuated to the fully open position.

6. The closure device of claim 5, wherein the first projecting lip is positioned at a free end of the tongue and the second projecting lip is positioned at the root end of the tongue.

7. The closure device of claim 6, wherein the first leash and the second leash connect to the cap body in proximity to the root end of the tongue.

8. The closure device of claim 6, wherein the tongue comprises a rib extending between the first projecting lip and the second projecting lip.

9. The closure device of claim 1, wherein at least one frangible bridge connects the cap body to the tamper evidence band.

10. The closure device of claim 1, wherein at least one frangible bridge connects the first leash and the second leash to the tamper evidence band.

11. The closure device of claim 10, wherein the at least one frangible bridge is more fragile than the first leash and the second leash.

12. The closure device of claim 1, wherein the first portion of each of the first leash and the second leash is formed within the tamper evidence band.

13. The closure device of claim 1, wherein the first leash and the second leash undergo twisting as the cap body moves from a closed position to the fully open position.

14. The closure device of claim 1, wherein the first leash and the second leash are sized to allow the cap body to be removed from the neck of the container.

15. The closure device of claim 1, wherein the cap body is positioned at an angle of 90° to 180° in relation to the container when in the fully open position.

16. The closure device of claim 1, wherein the cap body is retained in a closed position on the container by means of a threaded interface with the neck.

17. The closure device of claim 1, wherein from the fully open position, the cap body is configured to be actuated back to a closed configuration and be retained in the closed configuration via a threaded interface.

18. A mold comprising a female cavity piece and a male core piece, the female cavity piece and the male core piece defining a molding cavity configured to form the closure device of claim 1.

19. The closure device of claim 1, wherein the angle between the first portion and the second portion is between 135-160 degrees.

20. The closure device of claim 1, wherein the second portion of each of the first leash and second leash extend into the cap body towards the root end of the tongue.

21. The closure device of claim 1, wherein the second portion extends to the root end of the tongue.

22. The closure device of claim 1, wherein the second portion extends at an obtuse angle.

23. The closure device of claim 1, further comprising a root plane substantially parallel to the upper edge of the tamper evidence band extending from a root edge of the tongue, wherein the second portion connects to the cap body approximately at the root plane.

24. The closure device of claim 1 further comprising:

a triangular protrusion disposed on each side of the tongue between the tongue and the second portion on a same side of the tongue, wherein each triangular protrusion extends from a base portion connected to the tamper evidence band towards an apex of the triangular protrusion located towards the closed end of the cap, wherein each protrusion comprises a side edge substantially parallel to the second portion on the same side of the tongue.

25. The closure device of claim 24, wherein the side edge of each triangular protrusion is frangibly connected to the second portion on the same side of the tongue.

26. The closure device of claim 25, wherein the first leash and the second leash have a substantially uniform cross sectional area along a length of each leash extending between the cap body and the tamper evidence band.

27. The closure device of claim 1, wherein the second portion of each leash connects to the cap body.

* * * * *